(12) United States Patent
Mellon et al.

(10) Patent No.: US 6,390,299 B1
(45) Date of Patent: May 21, 2002

(54) PAPERBOARD CARRIER FOR PREPARED FOOD

(75) Inventors: Mark Mellon; William Roger Rigby, both of Midlothian, VA (US)

(73) Assignee: Westvaco Corp., Stamford, CT (US)

( * ) Notice: Subject to any disclaimer, the term of this patent is extended or adjusted under 35 U.S.C. 154(b) by 0 days.

(21) Appl. No.: 09/772,163

(22) Filed: Jan. 29, 2001

Related U.S. Application Data

(63) Continuation-in-part of application No. 09/518,211, filed on Mar. 3, 2000, now abandoned.

(51) Int. Cl.$^7$ ................................................. B65D 73/00
(52) U.S. Cl. .................. 206/485; 206/780; 229/117.15; 493/128; 493/162
(58) Field of Search ................................. 206/162, 167, 206/170, 174, 175, 194, 197, 434, 485, 485.1, 486, 490, 780; 229/117.14, 117.15; 294/152; 426/112, 115; 53/397–399, 461, 462, 473; 493/128, 162

(56) References Cited

U.S. PATENT DOCUMENTS

| | | |
|---|---|---|
| 1,192,168 A | 7/1916 | Cook |
| 1,691,995 A | 11/1928 | Saulter |
| 1,772,009 A | 8/1930 | Lackey |
| 1,798,612 A | 3/1931 | Malcolmson |
| 1,910,168 A | 5/1933 | Jacobs |
| 1,981,647 A | 11/1934 | Johnson |
| 1,987,491 A | 1/1935 | Nejelski |
| 2,284,290 A | 5/1942 | Marshell, Jr. |
| 2,304,683 A | 12/1942 | Finn et al. |
| 2,324,771 A | 7/1943 | Flore |
| 2,335,022 A | 11/1943 | O'Reilly |
| 2,550,417 A | 4/1951 | Klein |
| 2,701,089 A | 2/1955 | Fischer |
| 2,959,339 A | 11/1960 | Sierk et al. |
| 3,054,682 A | 9/1962 | Russell et al. |
| 3,123,204 A | 3/1964 | Baker et al. |
| 3,150,769 A | 9/1964 | Cohn |
| 3,166,235 A | 1/1965 | Schroeder |
| 3,181,772 A | 5/1965 | Collins et al. |
| 3,337,046 A | 8/1967 | Roy et al. |
| 3,363,747 A * | 1/1968 | Nowak ........................ 206/485 |
| 3,384,228 A | 5/1968 | Cannon |
| 3,399,819 A | 9/1968 | Rennie et al. |
| 3,516,595 A | 6/1970 | Bailey |
| 3,613,973 A | 10/1971 | Jaeschke |
| 3,799,424 A | 3/1974 | Mayea |
| 3,815,735 A * | 6/1974 | Cucuo ........................ 206/485 |
| 3,828,926 A * | 8/1974 | Rossi ........................ 206/485.1 |
| 3,923,236 A | 12/1975 | Calvert |
| 3,955,745 A | 5/1976 | Forrer |
| 3,981,400 A | 9/1976 | Quintana |
| 4,184,595 A | 1/1980 | Waskerman |
| 4,201,294 A | 5/1980 | Roccaforte |
| 4,399,939 A | 8/1983 | Tunick |
| 4,518,086 A | 5/1985 | Roccaforte |
| 4,948,036 A | 8/1990 | Loughman |
| 5,060,850 A | 10/1991 | Weaver |
| 5,248,081 A | 9/1993 | Hook |
| 5,267,644 A | 12/1993 | Tsao |
| 5,743,389 A | 4/1998 | Cutler et al. |
| 5,957,276 A | 9/1999 | Cutler et al. |

FOREIGN PATENT DOCUMENTS

| | | |
|---|---|---|
| FR | 1281318 | 12/1961 |
| FR | 2330268 | 5/1977 |

* cited by examiner

*Primary Examiner*—Luan K. Bui
(74) *Attorney, Agent, or Firm*—D. L. Bowman; T. B. McDaniel; R. L. Schmalz

(57) ABSTRACT

This invention relates to carrier straps for carrying prepared foods, such as rotisserie chickens, roasted turkey, roasted ham, side dishes or deserts. Such structures of this type, generally, employ a one-handed, paperboard strap which is wrapped around the plastic tray and plastic domed lid package in which the prepared food is located. The carrier strap secures the prepared food package and transports it so that the purchaser's hands do not get greasy or hot. Also, the carrier strap functions to provide a printable surface to identify flavor and brand.

8 Claims, 5 Drawing Sheets

PAPERBOARD CARRIER FOR PREPARED FOOD

CROSS REFERENCE TO OTHER U.S. PATENT APPLICATIONS

This application is a continuation in part of U.S. application Ser. No. 09/518,211 filed on Mar. 3, 2000, now abandoned.

BACKGROUND OF THE INVENTION

1. Field of the Invention

This invention relates to carrier straps for carrying prepared foods, such as rotisserie chickens, roasted turkey, roasted ham, side dishes or deserts. Such structures of this type, generally, employ a one-handed, paperboard strap which is wrapped around the plastic tray and plastic domed lid package in which the prepared food is located. The carrier strap secures the prepared food package and transports it so that the purchaser's hands do not get greasy or hot. Also, the carrier strap functions to provide a printable surface to identify flavor and brand.

2. Description of the Related Art

Rotisserie chickens and other prepared foods are being retailed in supermarkets utilizing a plastic tray and a plastic domed lid as a package. This package holds the prepared food and transports it reasonably well. However, it does require two hands and can be cumbersome, hot and/or greasy. It also lacks any printable surface making it difficult to identify flavor or establish brand identity.

Currently, pressure sensitive labels are being applied to identify flavor. There are also paperboard sleeves on plastic trays for the same purpose. Finally, plastic bags have been used to load the trays into, just prior to or immediately after purchase for ease in portability.

It is also known to employ paperboard carriers having straps. Exemplary of such prior art are U.S. Pat. No. 1,798,612 ('612) to J. D. Malcolmson, entitled "Two-Piece Carton Satchel", U.S. Pat. No. 1,910,168 ('168) to D. C. Jacobs, entitled "Carrier for Cups and Like Receptacles", U.S. Pat. No. 3,815,735 ('735to B. J. Cucuo, entitled "Carton", and U.S. Pat. No. 4,399,939 ('939) to A. L. Tunick, entitled "Caramel or Candy Apple Carton." While these references employ paperboard carriers having handles, none of them include a non-planar package, a carrier which allows the product to protrude through the side walls, a pre-glued carrier, and a carrier which slips over the product.

Furthermore, an additional problem exists in the transport of plastic tray and domed lid package, in that the shape of the package often makes it difficult to secure the package via a carrier strap for one-hand transport.

It is apparent from the above that there exists a need in the art for a paperboard carrier which is lightweight through simplicity of parts and uniqueness of structure, but which at the equals the carrying characteristics of the known carriers, but which at the same time employs a non-planar package, allows the product to protrude through the side walls, is pre-glued, and allows the carrier to slip over the product (i.e., allows the product to be inserted into the carrier from the end of the carrier). It is a purpose of this invention to fulfill this and other needs in the art in a manner more apparent to the skilled artisan once given the following disclosure.

SUMMARY OF THE INVENTION

Generally speaking, this invention fulfills these needs by providing a paperboard carrier for prepared foods, comprising a plurality of half base panels foldably connected to each other, a plurality of side panels foldably connected to the base panels wherein said side panels are further comprised of arched score lines which provide each side panel with a contact face, a plurality of top panels foldable connected to the side panels, and a plurality of handle panels foldably connected to the top panels such that the handle panels are substantially secured to each other and a prepared food item to be carried is: a) located substantially within the carrier, b) supported by the base panels, side panels, and top panels, and c) secured substantially within said carrier via contact with said contact faces. It should be noted that the arched score lines function to provide each side panel with an enhanced contact face which serves to secure the food item in such a manner as to minimize the risk of the food item slipping out of an open end of the carrier.

In certain preferred embodiments, the paperboard carrier is a non-planar carrier. Also, the item carried by the carrier protrudes partly through the side panels. Finally, the handle panels include a handle panel extension.

In another further preferred embodiment, the paperboard carrier allows the item to be easily transported and provides a printable surface to identify flavor and brand.

The preferred carrier, according to this invention, offers the following advantages: lightness in weight; improved transportation of the product; improved printability; excellent durability; excellent economy; and ease of assembly. In fact, in many of the preferred embodiments, these factors of lightness in weight, ease of transporting of the product, printability, and assembly are optimized to the extent that is considerably higher than heretofore achieved in prior, known carriers.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Figure 1:
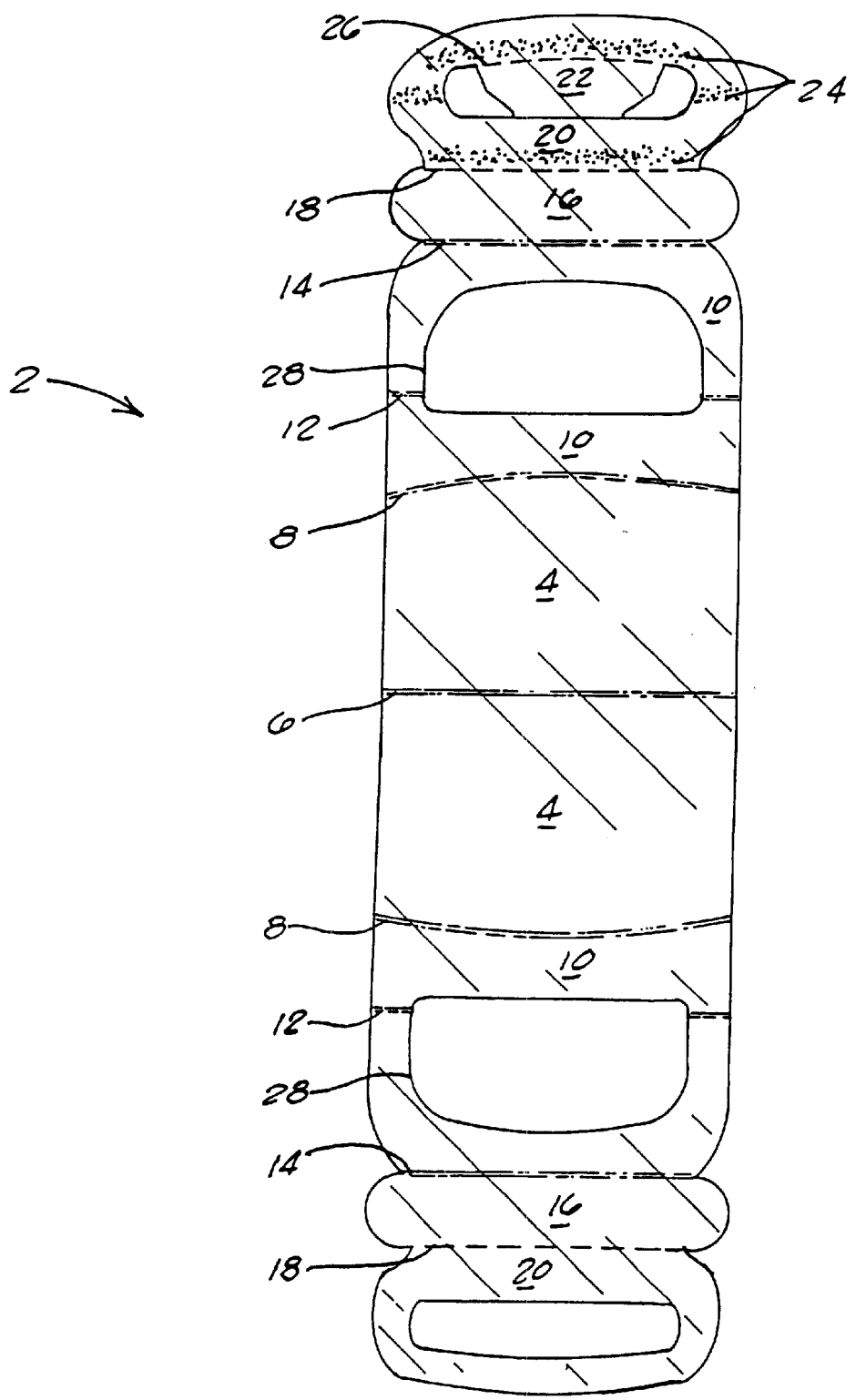
FIG. 1 is a side plan view of a die-cut paperboard blank for a carrier for prepared foods, prior, to gluing, according to the present invention.

With reference first to the FIG. 1, there is illustrated an advantageous environment for use of the concepts of this invention. In particular, die-cut carrier blank 2 is illustrated. Blank 2 includes;, in part, half base panels 4, score lines 6, arched score lines 8, side panels 10, score lines 12, score lines 14, top panels 16, score lines 18, handle panels 20, handle extension panel 22, adhesive areas 24, score line 26, and cut-outs 28.

Blank 2, preferably, is a paperboard substrate, which is typically a 0.016 inch thick sheet. Definitively, the term paperboard describes paper within the thickness range of 0.008 to 0.028 inches and including corrugated medium. The invention is relevant to the full scope of such a range as applied to packaging and beyond.

Blank 2, typically, receives on the under face or side (the side not shown in FIG. 1) a fluidizied mixture of finely particulated minerals and binders as a smooth coating. Minerals such as clay and calcium are most frequently used. Successive densification and polishing by calendering, finishes the mineral coated surface to a high degree of smoothness and a superior graphic print surface which is subsequently applied to the under face or side of blank 2. This printed surface is prepared to become the exterior surface of the present invention paperboard carrier.

The other side or face of blank 2, namely the side shown in FIG. 1, may also be coated with the particulated minerals and binders and/or with a film of polymer for the purpose of a grease barrier, protective barrier, moisture confinement, or heat seal ability.

Score lines 6, 12, 14, 18, and 26 are conventionally produced on blank 2. Score lines 8 must be created so as to produce an arc. It should be noted that these arched score lines 8 are a key feature of the invention in that they function to provide each side panel 10 with a contact face which serve to contact the package in such a manner as to secure the package in the carrier from slippage. Adhesive areas 24 are conventionally placed on one of the handle panels 20. Finally, cut-outs 28 are formed by conventional techniques.

Figure 2:
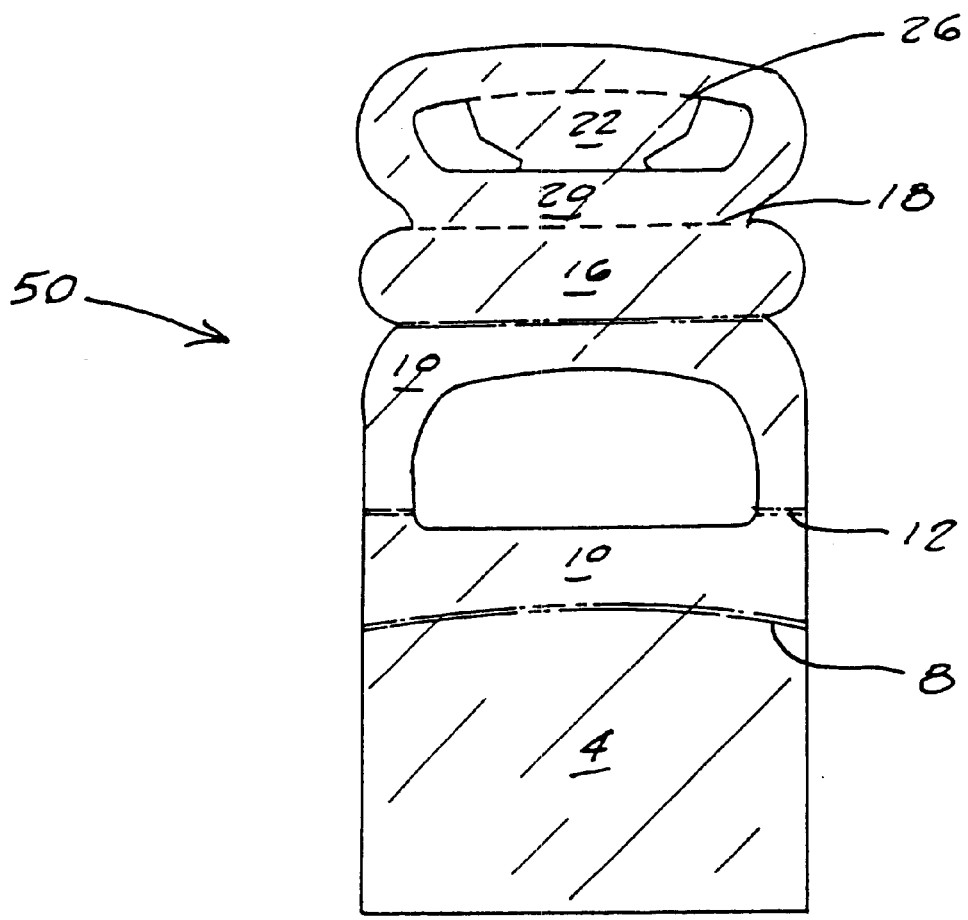
FIG. 2 is an isometric view of the carrier blank after it has been folded and glued, according to the present invention.

As shown in FIG. 2, handle panels 20 are overlapped and adhered together by conventional techniques in order to form carrier 50.

Figure 3:
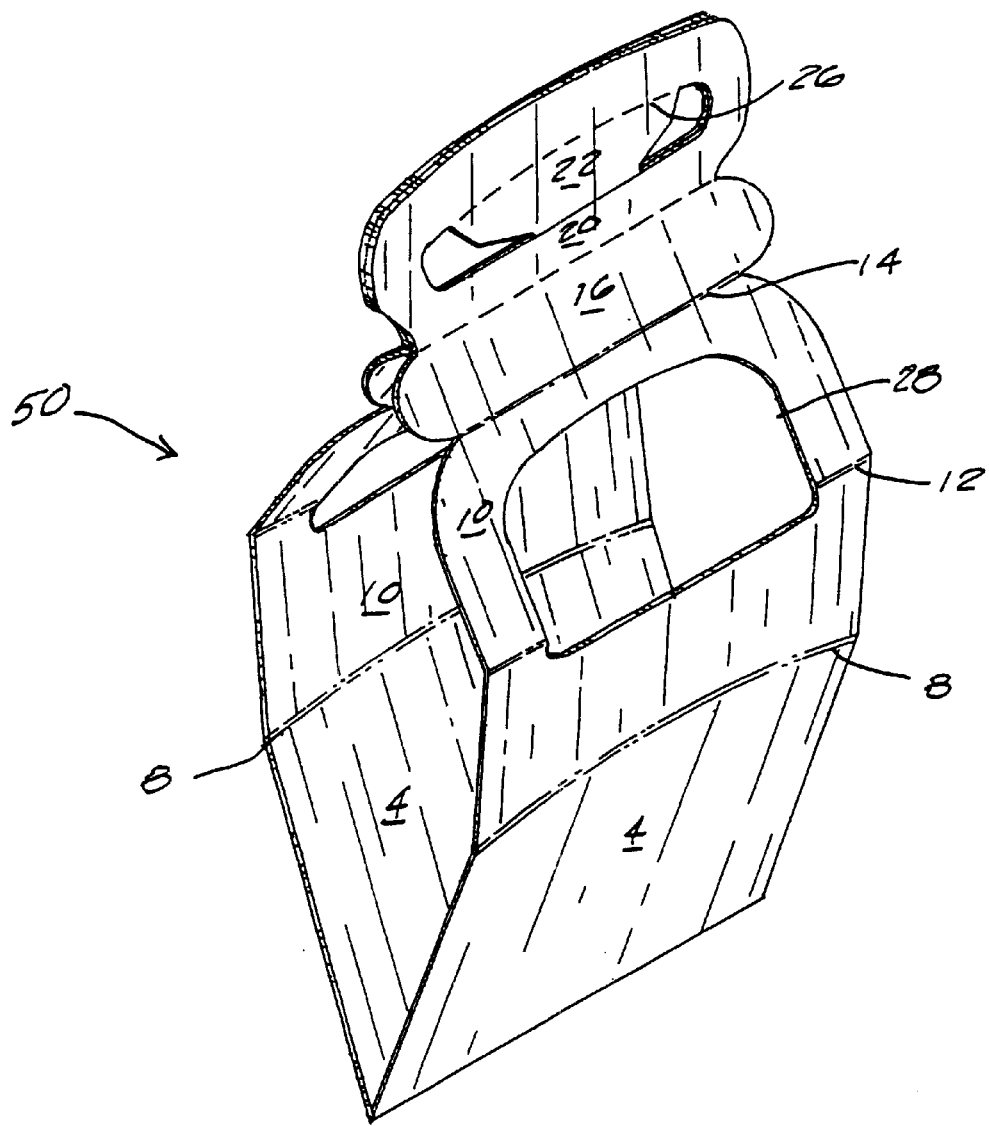
FIG. 3 is an isometric view of the assembled carrier prior to being loaded with a filled tray and lid.

As shown in FIG. 3, carrier 50 is opened such that side walls panels 10 extend away from each other.

Figure 4:
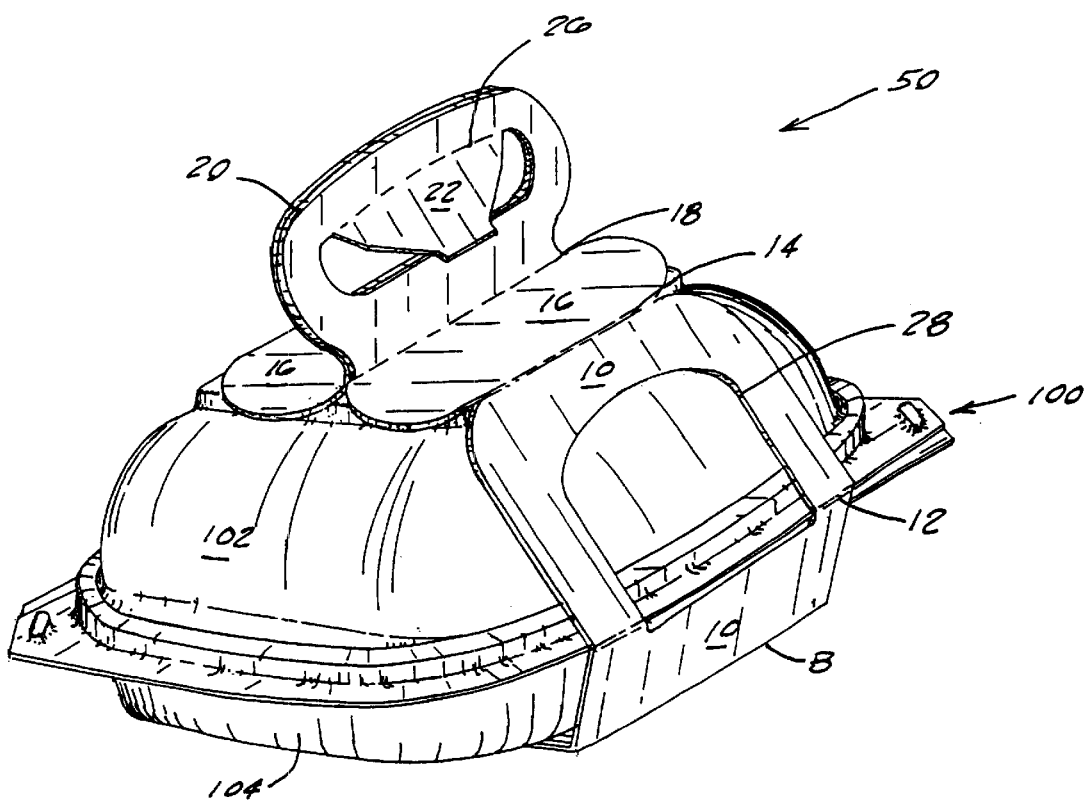
FIG. 4 is an isometric view illustrating how a filled tray and lid is located within the carrier.

As shown in FIG. 4, package 100, which includes lid 102 and tray 104, can be seen. Preferably, package 100 contains a hot prepared food, such as rotisserie chicken. As can be seen more; clearly in FIG. 4, package 100 is located within carrier 50 such that package 100 is securely retained within carrier 50. It should be noted that the side panels 10 function to contact the package 100 at contact faces in such a manner as to secure the package 100 in the carrier 50. It must be pointed out that cut-outs 28 not only provide product visibility of package 100, but also allow package 100 to pass through the plane of side walls 10 and provide additional resistance to keep package 100 from sliding out of carrier 50. By having cut-outs 28, this creates two theoretical points of contact (contact faces) between package 100 and carrier 50 rather than if carrier 50 was without cut-outs 28. Cut-outs 28 also allow for the lifting forces to be distributed to the edges of package 100 in addition to lifting from the bottom in the fashion of a sling. Ultimately, this provides more downward weight which adds even greater side pressure which grips package 100 even tighter.

It should be noted that handle panel extension 22 has a dual function. It is folded under handle panels 20 to create added handle rigidly and afterwards can be removed as a coupon, proof of purchase, recipe, or the like.

Figure 5:
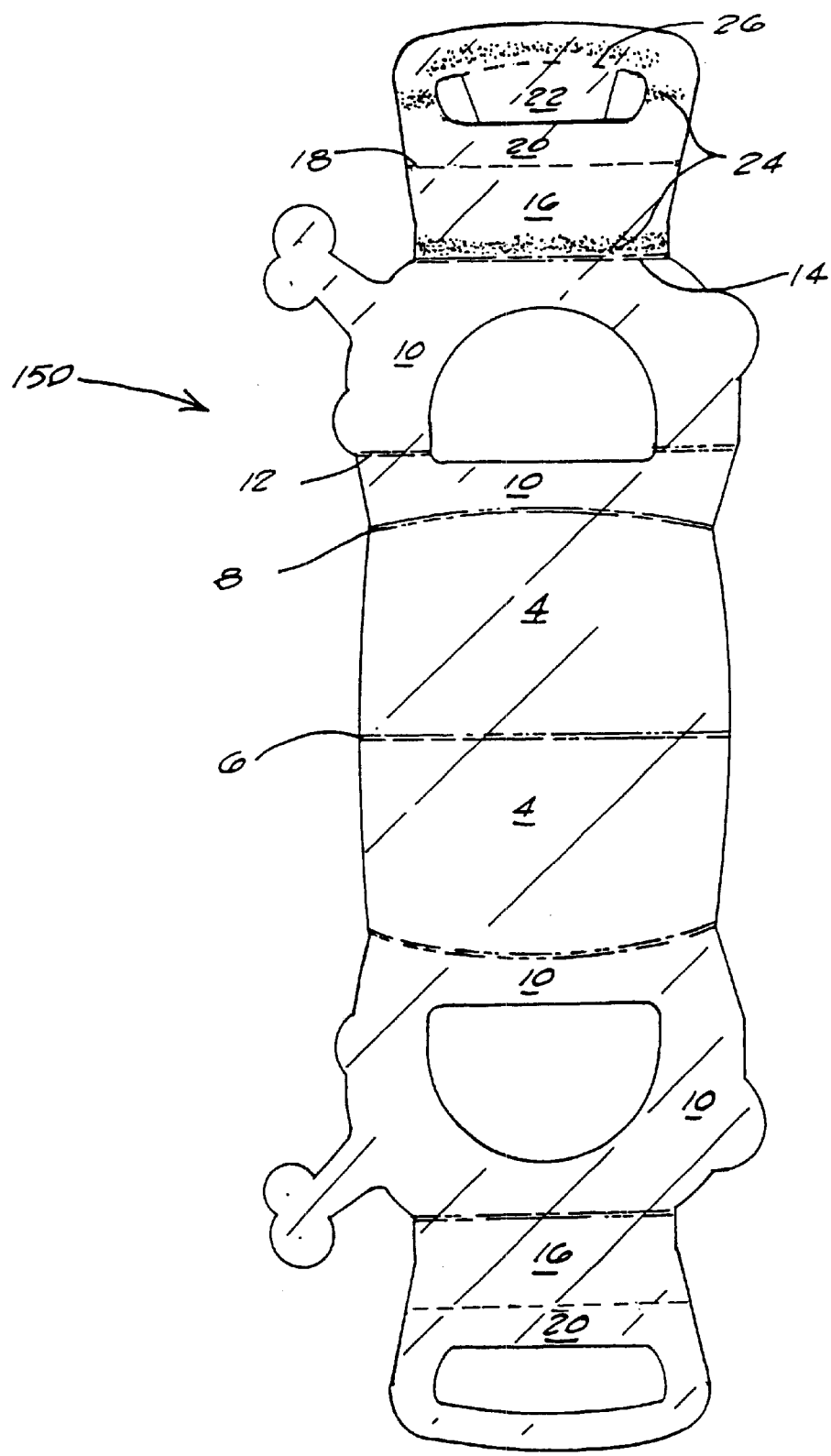
FIG. 5 is a side plan view of another die-cut carrier blank.

With respect to FIG. 5, this illustrates how blank 2 can be die-cut to provide further aesthetic appeal. In this instance, blank 150 represents the side of the cooked chicken with the drum sticks poking up. This blank 150 is formed into carrier 50 in the same manner as previously discussed.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A paperboard carrier for prepared foods, wherein said paperboard carrier is comprised of:

a plurality of halfbase panels foldably connected to each other;

two side panels foldably connected along an arched score line to opposite sides of said plurality of half base panels, wherein said two side panels have at least one aperture located at least some distance from said arched score lines;

a plurality of top panels foldably connected to said side panels; and a plurality of handle panels foldably connected to said plurality of top panels wherein sad plurality of handle panels are substantially secured to each other so that said paper board carrier has two open regions on opposite ends from where said two side panels are connected to said plurality of half base panels.

2. The paperboard carrier, as in claim 1, wherein said two side panels have a score line some distance between said arched score lines and said plurality of top panels.

3. The paperboard carrier as in claim 1, wherein said apertures in said two side panels are dimensioned to secure a container so that at least some portion of said container extends through said apertures.

4. The paperboard carrier, as in claim 1, wherein said plurality of handle panels are secured by adhesive.

5. A blank for a paperboard carrier for prepared foods, wherein said blank is comprised of:

a plurality of half base panels foldably connected to each other;

two side panels foldably connected along an arched score line to opposite sides of said plurality of half-base panels, wherein said two side panels have at least one aperture located at least some distance from said arched score lines;

a plurality of top panels foldably connected to said two side panels; and a plurality of handle panels foldably connected to said plurality of said top panels wherein said plurality of handle panels are substantially secured to each other so that said paperboard carrier has two open regions on opposite ends from where said two side panels are connected to said plurality of half base panels.

6. The blank, as in claim 5, wherein adhesive is secured to at least one of said plurality of handle panels.

7. A method of fabricating a paperboard carrier for prepared foods comprising:

providing a paperboard blank:

folding said blank to form a plurality of half base panels foldably connected to each;

folding said blank to form two side panels foldably connected along an arched score line to opposite sides of said half-base panels;

folding said blank to form a plurality of top panels foldably connected to said plurality of side panels;

folding said blank to form a plurality of handle panels foldably connected to said plurality of top panels;

securing said plurality of handle panels to each other with adhesive; and forming at least one aperture in each of said two side panels at least some distance from said arched score line and said plurality of top panels.

8. The method, as in claim 7, wherein said method is further comprised of manipulating said blank to form two open regions on opposite ends from where said two side panels are connected to said plurality of half-base panels.

* * * * *